United States Patent [19]

VanderPol et al.

[11] Patent Number: 4,890,385
[45] Date of Patent: Jan. 2, 1990

[54] AUTOMATIC FEED SYSTEM FOR A TUBE CUTTER

[75] Inventors: Jerald VanderPol, Eldorado Hills; Cory J. Silber, Sacramento, both of Calif.

[73] Assignee: Tri Tool Inc., Rancho Cordova, Calif.

[21] Appl. No.: 161,972

[22] Filed: Feb. 29, 1988

[51] Int. Cl.⁴ ............................................. B23D 21/06
[52] U.S. Cl. ....................................... 30/101; 30/102; 30/94
[58] Field of Search ...................... 30/101, 102, 92, 93, 30/94; 82/4 C, 60

[56] References Cited

U.S. PATENT DOCUMENTS

| | | |
|---|---|---|
| 882,432 | 3/1908 | Thomas . |
| 1,092,304 | 4/1914 | Strickler . |
| 2,271,582 | 2/1942 | Dixon ........................... 30/97 |
| 2,373,472 | 4/1945 | Haumiller ..................... 164/60 |
| 2,379,177 | 6/1945 | Pavey ............................ 30/99 |
| 2,447,371 | 8/1948 | Sipsma et al. ................ 30/99 |
| 2,769,235 | 11/1956 | Martois ........................ 30/97 |
| 3,370,352 | 2/1968 | Steely .......................... 30/97 |
| 3,431,646 | 3/1969 | Young ........................... 30/97 |
| 3,715,804 | 2/1973 | Kelley .......................... 30/102 |
| 3,807,047 | 4/1974 | Sherer et al. ................ 30/97 |
| 3,839,791 | 2/1973 | Feamster, III ............... 30/97 |
| 4,305,205 | 12/1981 | Girala ........................... 30/102 |
| 4,416,062 | 11/1983 | Cummings .................... 30/101 |
| 4,438,562 | 3/1984 | Courty .......................... 30/99 |
| 4,493,150 | 1/1985 | Garcia et al. ................ 30/97 |

FOREIGN PATENT DOCUMENTS 777196  6/1957  United Kingdom .

Primary Examiner—Donald R. Schran
Assistant Examiner—Willmon Fridie, Jr.
Attorney, Agent, or Firm—Bacon & Thomas

[57] ABSTRACT

An automatic feed system for a tube cutter is disclosed which automatically feeds a cutting tool into a tube and also automatically resets the cutting tool to its initial position once the tube has been cut. The automatic feed system has a cam element rotatably mounted in a cutting head defining a cam surface eccentric with respect to the axis of rotation of the cam element. A cam follower is formed on a cutting arm which is pivotally attached to the cutting head and has a cutting wheel attached thereto. The eccentric cam surface includes a substantially flat surface portion which lies in a plane extending substantially parallel to the axis of rotation of the cam element which, when contacted by the cam follower, allows the pivot arm to assume an initial, retracted position. As the cam element rotates, the eccentric cam surface and the cam follower urge the cutting wheel into the tube wall. After the cam element has completed one rotation, the cam follower once again contacts the flat surface portion, thereby automatically retracting the cutting arm and the cutter wheel. The cam element is driven by a worm gear attached thereto, which engages a worm. A star wheel is operatively connected to the worm to impart rotational motion to the worm gear.

25 Claims, 3 Drawing Sheets

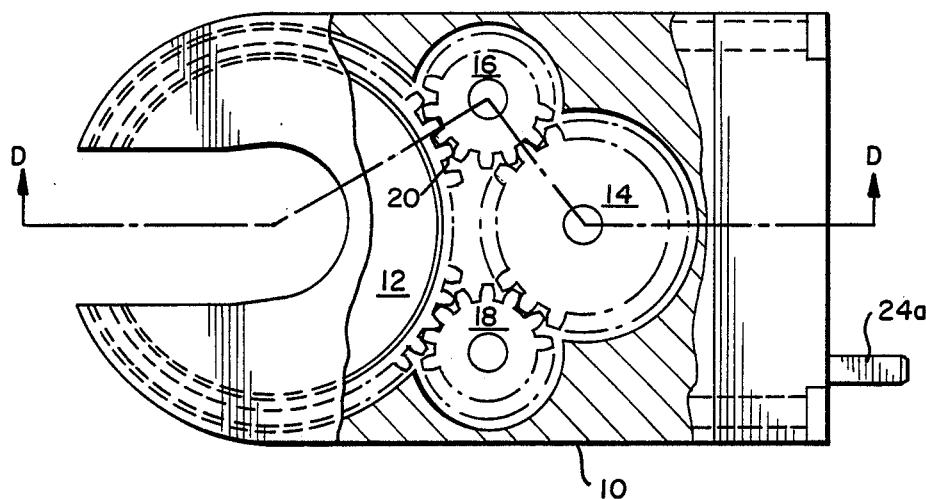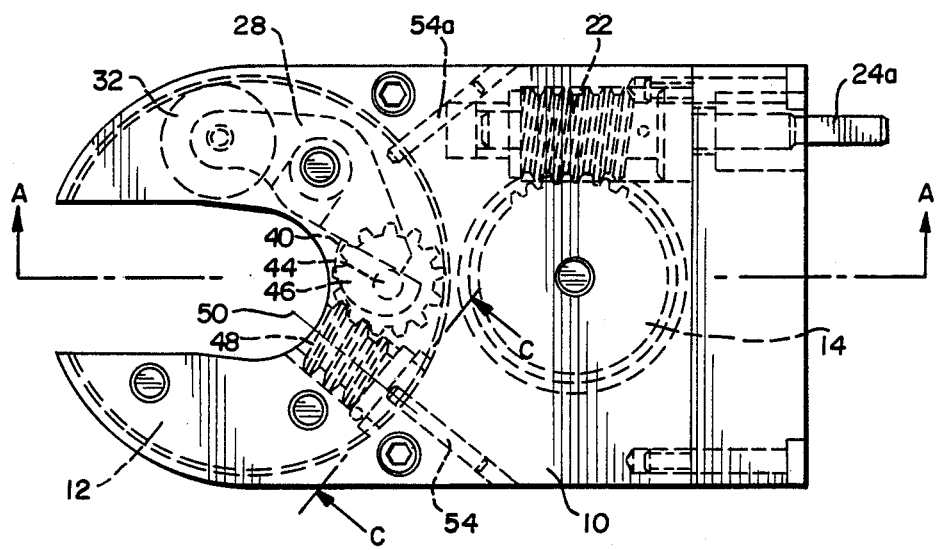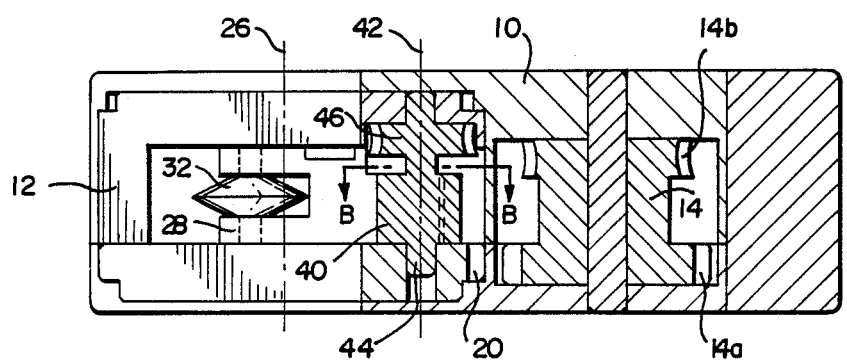

AUTOMATIC FEED SYSTEM FOR A TUBE CUTTER

BACKGROUND OF THE INVENTION

The present invention relates to a tube cutter having an automatic feed system which will automatically feed a cutting tool into a tube as a cutting head rotates and which will automatically reset the cutting tool to an initial position when the cutting has been completed.

Tools for cutting tubing are well known in the art and typically comprise a rotatable cutting head mounted in a stationary housing. A cutting tool, such as a cutting wheel, is mounted on the cutting head such that it revolves around the tube. Feed means are incorporated in the device to exert a force on the cutting wheel urging it into the tube wall. The cutting tool is revolved about the tube and feed inwardly until it has completely severed the tube wall.

Usually the feed systems of the known devices comprise a cutting tool holder engaged with a threaded feed screw. The feed screw may be rotated by a star wheel attached thereto which contacts a fixed pin during rotation of the cutting head. While these systems serve to adequately feed the cutting tool into the tube wall, retraction of the cutting wheel to its initial position after the tube has been cut requires the feed screw to be turned in the opposite direction, a laborious and time consuming task.

It has also been proposed to provide the cutting device with a helical cam which automatically resets the cutting tool after the cut has been completed. The helical cam is attached to a generally radially extending rod which bears against the cutting tool holder. The rotation of the helical cam produces radial motion of the rod to urge the cutting tool against the tube. The radial movement is caused by the helical surface of the cam bearing against a fixed pin on the cutting head. After a complete revolution of the helical cam, a spring biasing force acting on the cutting tool holder returns the cutting tool to its initial position. The periphery of the helical cam is serrated to form ratchet teeth which contact a separate pawl, also attached to the cutting head, to limit the rotation of the cam to one direction. The serrations also contact a fixed plate, attached to the tube cutter housing so as to advance the cam for each revolution of the cutting head.

The foregoing feed system has been found satisfactory for relatively large tube cutting devices. However, the orientation of the helical cam, the generally radial actuating rod and the separate pawl are impractical in a compact tool cutter designed for cutting tubes having limited access space. Quite obviously, it is necessary to minimize the dimensions of the outer housing of such devices in order to enable the cutter to be placed about the tube. The space requirements of the known automatic feed systems are such that they prevent the use of minimum sized housings, thereby rendering the tube cutters having such feed systems unsuitable for use in limited access areas.

SUMMARY OF THE INVENTION

The present invention relates to an automatic feed system for a tube cutter which not only automatically feeds the cutting tool into the tube wall as it revolves around the tube, but one which also automatically resets the cutting tool to its initial, retracted position once the tube has been cut. The specific mechanism of the invention minimizes the space requirements on such an automatic feed system so as to render it compatible for use in tube cutters having minimum dimensions so as to be readily accessible to tubes having a limited access space.

The automatic feed system according to the invention has a cam element rotatably mounted in the cutting head, the cam element defining a cam surface eccentric with respect to the axis of rotation of the cam element. A cam follower is formed on a cutting arm which is pivotally attached to the cutting head and has a cutting wheel attached thereto. The eccentric cam surface includes a substantially flat surface portion which lies in a plane extending substantially parallel to the axis of rotation of the cam element which, when contacted by the cam follower, allows the pivot arm to assume an initial, retracted position. As the cam element rotates, the eccentric cam surface and the cam follower urges the cutting wheel into the tube wall. After the cam element has completed one revolution, the cam follower once again contacts the flat surface portion, thereby automatically retracting the cutting arm and the cutter wheel.

The cam element is driven by a worm gear attached thereto, which engages a worm. A star wheel is operatively connected to the worm such that, as the cutting head rotates, the star wheel contacts a tripper pin located on the tube cutter housing causing partial rotation of the star wheel for each revolution of the cutting head. The rotation of the star wheel also rotates the worm which, in turn, drives the worm gear and the cam element.

The drive mechanism is completely contained within the confines of the rotatable cutting head, except for the tripper pin which is attached to the housing surrounding the cutting head. The star wheel and worm rotate about an axis extending substantially perpendicular to the axis of rotation of the cam element.

A BRIEF DESCRIPTION OF THE DRAWINGS

FIG. 3 is a bottom view, partially broken away, of the tube cutter of FIG. 1 showing the cutter head drive gears.

FIG. 4 is a top view of the tube cutter of FIG. 1.

FIG. 5 is a longitudinal cross sectional view taken along line A—A in FIG. 4.

DETAILED DESCRIPTION OF THE PREFERRED EMBODIMENT

Figure 1:
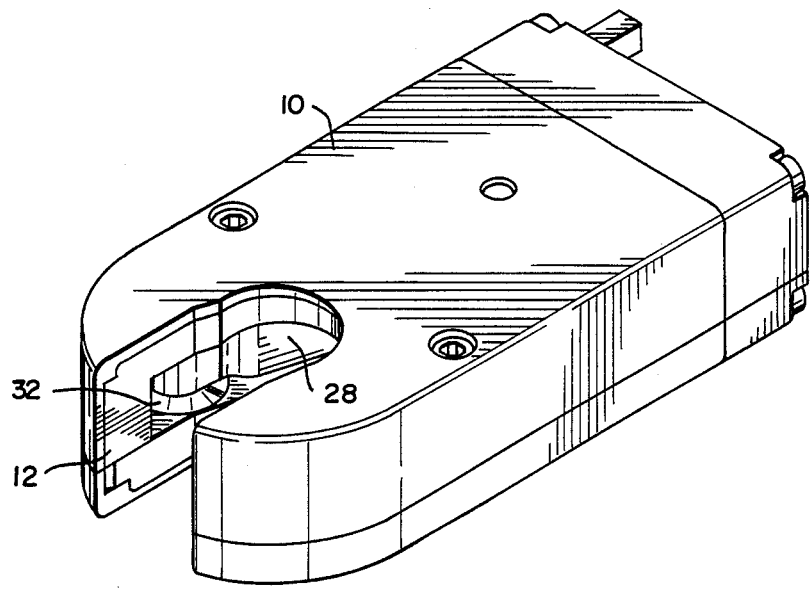
FIG. 1 is a perspective view of a tube cutter incorporating the automatic feed system according to the invention.

The automatic feed system according to this invention will be described in terms of usage with a gear driven tube cutter of the type set forth in U.S Ser. No. 082,135 to VanderPol et al, filed on Aug. 6, 1987 and entitled "Gear Driven Tube Cutter" now U.S. Pat. No. 4,802,278. However, it is to be understood that the automatic feed system may be utilized with any type of tube cutter having a rotatable cutting head.

The tube cutter has a housing 10 enclosing rotating cutting head 12 and the drive means for rotating the cutting head 12 with respect to housing 10. The drive system, which is described in detail in Ser. No. 082,135, which is herein incorporated by reference, may comprise a main drive gear 14 rotatably mounted in the housing and operatively engaging a pair of driven pinion gears 16 and 18 as illustrated in FIG. 3. Each of the pinion gears 16 and 18 engage cutter head drive gear 20, having a generally "C" shape and attached to the periphery of cutting head 12. Main drive gear 14 has a portion 14a formed as a pinion gear which drivingly engages driven pinion gears 16 and 18, and a portion 14b formed as a worm gear, as illustrated in FIG. 5. Worm gear portion 14b engages worm 22 rotatably mounted in housing 10 by drive shaft 24. Drive shaft 24 has a polygonal cross-section end 24a adapted to engage a rotative power source.

Thus, as can be seen, rotation of shaft 24 rotates worm 22 which rotates main drive gear 14 due to its engagement with worm gear portion 14b. Rotation of main drive gear 14 rotates driven pinion gears 16 and 18 which, in turn, cause rotation of cutting head 12 with respect to housing 10.

Figure 2:
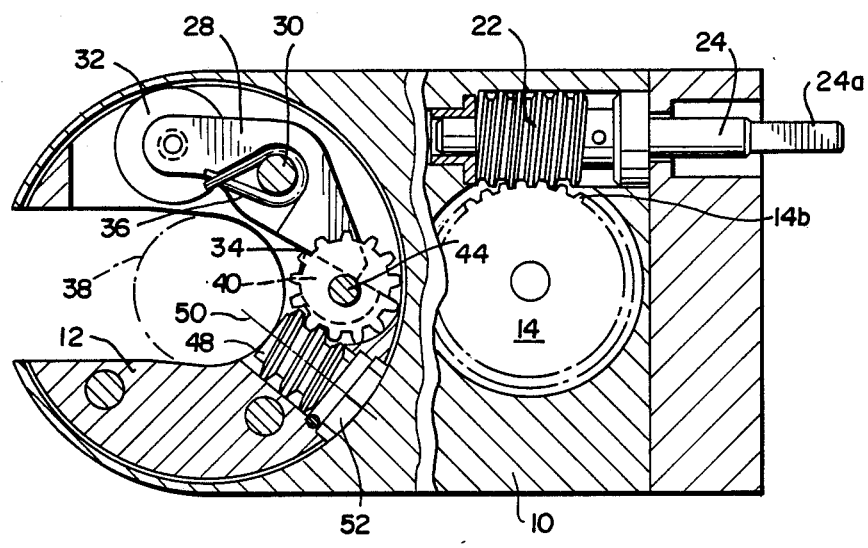
FIG. 2 is a longitudinal cross sectional view, of a tube cutter incorporating the automatic feed system according to the invention.
Figure 6:
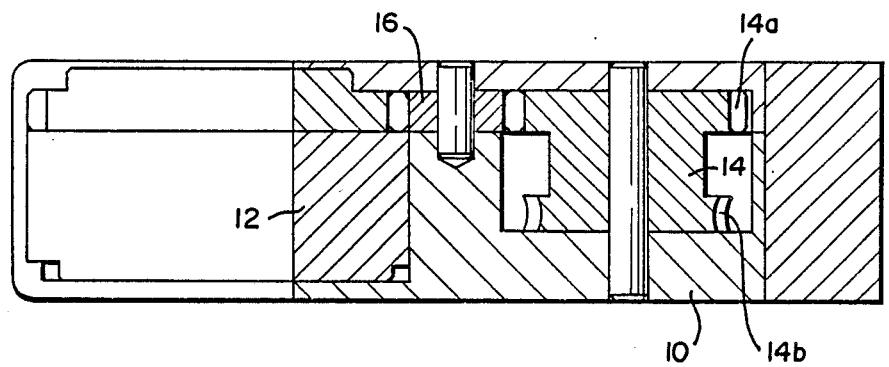
FIG. 6 is a longitudinal cross-sectional view taken along line D—D in FIG. 3.

Cutting head 12 is rotatably mounted in housing 10 so as to rotate about axis 26. Cutting arm 28 is pivotally attached to the cutting head by pivot pin 30 and has cutting wheel 32 attached to one end and a cam follower 34 formed on an opposite end. Torsion spring 36 is mounted around pivot pin 30 such that one end bears against the cutting arm 28 and the second end bears against the cutting head 12 so as to bias the cutting arm 28 in a clockwise direction around pivot pin 30 as shown in FIG. 2. Thus, torsion spring 36 normally biases the cutting wheel 32 out of contact with a tube, shown in phantom lines at 38 in FIG. 2. The cutting arm 28 along with the cutting wheel 32 are shown in their initial, retracted positions in FIG. 2.

The automatic feed system according to the invention serves to pivot the cutting arm 28 in a counter clockwise direction around pivot pin 30, overcoming the spring biasing force of spring 36, as cutting head 12 rotates about axis 26, such that cutting wheel 32 is brought into contact with the wall of tube 38. As cutting head 12 rotates, cutting wheel 32 is fed into the wall of tube 38 until the wall has been completely severed. Once the wall has been severed, the automatic feed means automatically returns the cutting arm 28 to its initial, retracted position.

The automatic feed system according to the invention comprises a cam element 40 mounted on the cutting head 12 so as to rotate about axis 42 extending substantially parallel to the axis 26 of the cutting head 12. Mounting shaft 44 extends along rotational axis 42 and is fixedly attached to cam element 40. Worm gear 46 is also fixedly attached to shaft 44 such that it rotates with cam element 40 as a unit.

Worm 48 is mounted in cutting head 12 so as to rotate about axis 50 as illustrated in FIGS. 2 and 4. Axis 50 extends substantially perpendicular to axes 26 and 42. Worm 48 operatively engages worm gear 46 such that its rotation about axis 50 will cause rotation of worm gear 46 as well as cam element 40.

Figure 7:
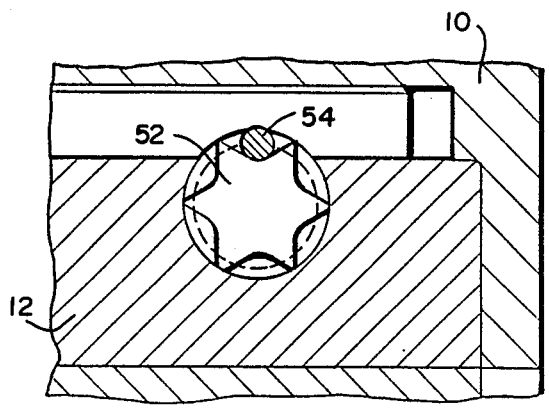
FIG. 7 is a partial, sectional view taken along line C—C in FIG. 4.

Star wheel 52 is fixedly attached to worm 48 so as to rotate therewith. Star wheel 52 has a series of indentations formed in its periphery as illustrated in FIG. 7. A portion of the periphery of star wheel 52 extends beyond the cutting head 12 so as to expose this portion of the star wheel for contact with a tripper pin 54. Tripper pin 54 is fixedly attached to the housing 10 such that a portion extends into the path of travel of the star wheel 52. Thus, as cutting head 12 rotates, tripper pin 54 contacts one of the indentations formed in star wheel 52 thereby causing the star wheel 52 to rotate about axis 50 with respect to the cutting head 12. The rotation of star wheel 52 rotates worm 48, which, in turn, causes rotation of cam element 40 through the engagement with worm gear 46. Additional tripper pins illustrated at 54a may be attached to the housing and extend into the path of travel of the star wheel 52 if desired in order to vary the feed rate of the cutting wheel 32 into the tube 38.

Figure 8:
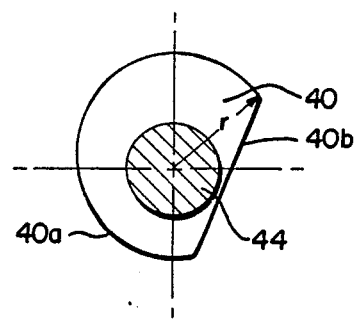
FIG. 8 is a view taken along line B—B in FIG. 5 showing the eccentric cam according to the invention.

As best seen in FIG. 8, cam element 40 defines a cam surface 40a which is eccentric with respect to axis 42, the axis of rotation of the cam element. The cam surface 40a defines a flat surface portion 40b which lies in a plane extending substantially parallel to axis 42. Although, quite obviously, the dimensions of the eccentric cam surface will vary depending upon the geometry of the cutting arm and the size of the cutting head and cutting arm, cam surface 40a has a maximum radial dimension r at the intersection of the curved surface 40a and the flat surface portion 40b as illustrated in FIG. 8. In a particular application of this feed system, the radial dimension r was 0.375 inches and the eccentric surface 40a had a radial dimension which was reduced by 0.0084 inches every 15 degrees in a counter clockwise direction from the maximum radial dimension point.

In operation, the cutting arm 28 is shown in FIG. 2 in its initial, retracted position so as to facilitate the insertion of the cutting tool over a tube 38. Both housing 10 and cutting head 12 define an outwardly facing slot to allow the device to be placed laterally over the tube, although the housing and cutting head may define an opening extending parallel to rotational axis 26, if desired. Cam element 40 is in the position shown in FIG. 2 such that cam follower 34 bears against flat surface portion 40b. Once the device has been placed over the tube, shaft 24 is connected to a power source and the rotation of cutting head 12 commences through the previously described drive system. Rotation of cutting head 12 brings star wheel 52 into contact with tripper pin 54 so as to rotate worm 48, worm gear 46 and cam element 40. The rotation of cam element 40, brings eccentric cam surface 40a into contact with the cam follower 34 so as to pivot cutting arm 28 in a counter clockwise direction (as seen in FIG. 2) around pivot pin 30 to thereby bring cutting wheel 32 into contact with tube 38. The eccentric cam surface 40a has a continually increasing radial dimension which continually urges the cutting arm 28 in the counter clockwise direction as shown in FIG. 2. This continually urges the cutting wheel 32 into contact with the tube 38 until the wall of the tube has been completely severed. Continued rotation of cutting head 12 will bring flat surface portion 40b back into contact with cam follower 34 thereby allowing the cutting arm 28 to pivot about pivot pin 30 in a clockwise direction due to the action of torsion spring 36 so as to return it to its initial position shown in FIG. 2.

The foregoing description is provided for illustrative purposes only and should not be construed as in any way limiting this invention, the scope of which is defined solely by the appended claims.

What is claimed is:

1. An automatic feed system for a tube cutter having a rotatable cutting head and a cutting means attached to a cutting arm pivotally attached to the cutting head wherein the cutting head defines means to accommodate a tube therein, the feed system comprising:
- (a) a cam element mounted on the cutting head so as to rotate about an axis, the cam element having an eccentric cam surface;
- (b) cam follower means on the cutting arm;
- (c) biasing means biasing the cam follower means into contact with the eccentric cam surface; and,
- (d) drive means to rotate the cam element at least a portion of a revolution for each revolution of the cutting head such that the cutting arm pivots, thereby urging the cutting means into contact with a tube located in the tube cutter.

2. The automatic feed system according to claim 1 wherein the axis of rotation of the cam element extends substantially parallel to an axis of rotation of the cutting head.

3. The automatic feed system according to claim 1 wherein the eccentric cam surface includes a substantially flat surface portion lying in a plane extending substantially parallel to the axis of rotation of the cam element such that, when the cam follower means is in contact with the flat surface portion, the cutting arm is in a retracted position.

4. The automatic feed system according to claim 1 wherein the drive means comprises:
- (a) first gear means operatively connected to the cam element;
- (b) second gear means rotatably mounted on the cutting head so as to be in operative engagement with the first gear means; and,
- (c) rotational means to rotate the second gear means at least a portion of a revolution for each revolution of the cutting head.

5. The automatic feed system according to claim 4 wherein the rotational means comprises:
- (a) a star wheel mounted on the cutting head so as to travel in a generally circular path as the cutting head rotates, and operatively connected to the second gear means; and,
- (b) at least one stationary tripper pin extending into the path of travel of the star wheel so as to contact the star wheel as the cutting head rotates.

6. The automatic feed system according to claim 4 wherein the first gear means comprises a worm gear and the second gear means comprises a worm.

7. The automatic feed system according to claim 6 wherein the rotational means comprises:
- (a) a star wheel mounted on the cutting head so as to travel in a generally circular path as the cutting head rotates, and operatively connected to the second gear means; and,
- (b) at least one stationary tripper pin extending into the path of travel of the star wheel so as to contact the star wheel as the cutting head rotates.

8. The automatic feed system according to claim 7 wherein the eccentric cam surface includes a substantially flat surface portion lying in a plane extending substantially parallel to the axis of rotation of the cam element such that, when the cam follower means is in contact with the flat surface portion, the cutting arm is in a retracted position.

9. The automatic feed system according to claim 8 wherein the axis of rotation of the cam element extends substantially parallel to an axis of rotation of the cutting head.

10. The automatic feed system according to claim 9 wherein the star wheel and worm rotate about a common axis extending substantially perpendicular to the axis of rotation of the cam element.

11. A tube cutter comprising:
- (a) a housing defining means to accommodate a tube therein;
- (b) a cutting head mounted in the housing so as to rotate about a first axis, the cutting head also defining means to accommodate a tube therein;
- (c) drive means in the housing and operatively connected to the cutting head so as to rotate the cutting head with respect to the housing;
- (d) a cutting arm pivotally attached to the cutting head, the arm having a cutting wheel attached thereto;
- (e) cam follower means formed on the cutting arm;
- (f) a cam element mounted in the cutting head so as to rotate about a second axis, the cam element defining a cam surface eccentric with respect to the second axis;
- (g) spring biasing means biasing the cam follower means into sliding contact with the eccentric cam surface;
- (h) first gear means operatively connected to the cam element;
- (i) second gear means rotatably mounted on the cutter head so as to be in operative engagement with the first gear means; and,
- (j) rotational means to rotate the second gear means at least a portion of a revolution for each revolution of the cutting head to thereby rotate the first gear means and the cam element so as to pivot the cutting arm to urge the cutting wheel into contact with a tube extending through the cutter.

12. The automatic feed system according to claim 11 wherein the axis of rotation of the cam element extends substantially parallel to an axis of rotation of the cutting head.

13. The automatic feed system according to claim 11 wherein the eccentric cam surface includes a substantially flat surface portion lying in a plane extending substantially parallel to the axis of rotation such that, when the cam follower means is in contact with the flat surface portion, the cutting arm is in a retracted position.

14. The automatic feed system according to claim 11 wherein the rotational means comprises:
- (a) a star wheel mounted on the cutting head so as to travel in a generally circular path as the cutting head rotates, and operatively connected to the second gear means; and,
- (b) at least one tripper pin mounted on the housing and extending into the path of travel of the star wheel so as to contact the star wheel as the cutting head rotates.

15. The automatic feed system according to claim 14 wherein the first gear means comprises a worm gear and the second gear means comprises a worm.

16. The automatic feed system according to claim 15 wherein the rotational means comprises:
- (a) a star wheel mounted on the cutting head so as to travel in a generally circular path as the cutting head rotates, and operatively connected to the second gear means; and,
- (b) at least one tripper pin mounted on the housing and extending into the path of travel of the star wheel so as to contact the star wheel as the cutting head rotates.

17. The automatic feed system according to claim 16 wherein the eccentric cam surface includes a substantially flat surface portion lying a plane extending substantially parallel to the axis of rotation of the cam element such that, when the cam follower means is in contact with the flat surface portion, the cutting arm is in a retracted position.

18. The automatic feed system according to claim 17 wherein the axis of rotation of the cam element extends substantially parallel to an axis of rotation of the cutting head.

19. The automatic feed system according to claim 18 wherein the star wheel and worm rotate about a common axis extending substantially perpendicular to the axis of rotation of the cam element.

20. An automatic feed system for a tube cutter having a rotatable cutting head and a cutting means mounted on the cutting head wherein the cutting head defines means to accommodate a tube therein, the feed system comprising:
(a) a cam element mounted on the cutting head so as to rotate about an axis, the cam element having an eccentric cam surface with a return portion and a feed portion;
(b) cam follower means on the cutting means in contact with the cam surface; and,
(c) drive means to rotate the cam element at least a portion of a revolution for each revolution of the cutting head about its axis such that engagement of the eccentric feed portion of the cam surface with the cam follower means urges the cutting means into the tube and engagement of the return portion with the cam follower means automatically returns the cutting means to a retracted position.

21. The automatic feed system according to claim 20 wherein the axis of rotation of the cam element extends substantially parallel to an axis of rotation of the cutting head.

22. The automatic feed system according to claim 20 wherein the return portion of the cam surface comprises a substantially flat surface portion lying in a plane extending substantially parallel to the axis of rotation of the cam element such that, when the cam follower means is in contact with the flat surface portion, the cutting arm is in a retracted position.

23. The automatic feed system according to claim 20 wherein the drive means comprises:
(a) first gear means operatively connected to the cam element;
(b) second gear means rotatably mounted on the cutting head so as to be in operative engagement with the first gear means; and,
(c) rotational means to rotate the second gear means at least a portion of a revolution for each revolution of the cutting head.

24. The automatic feed system according to claim 23 wherein the rotational means comprises:
(a) a star wheel mounted on the cutting head so as to travel in a generally circular path as the cutting head rotates, and operatively connected to the second gear means; and,
(b) at least one stationary tripper pin extending into the path of travel of the star wheel so as to contact the star wheel as the cutting head rotates.

25. The automatic feed system according to claim 23 wherein the first gear means comprises a worm gear and the second gear means comprises a worm.

* * * * *